UNITED STATES PATENT OFFICE.

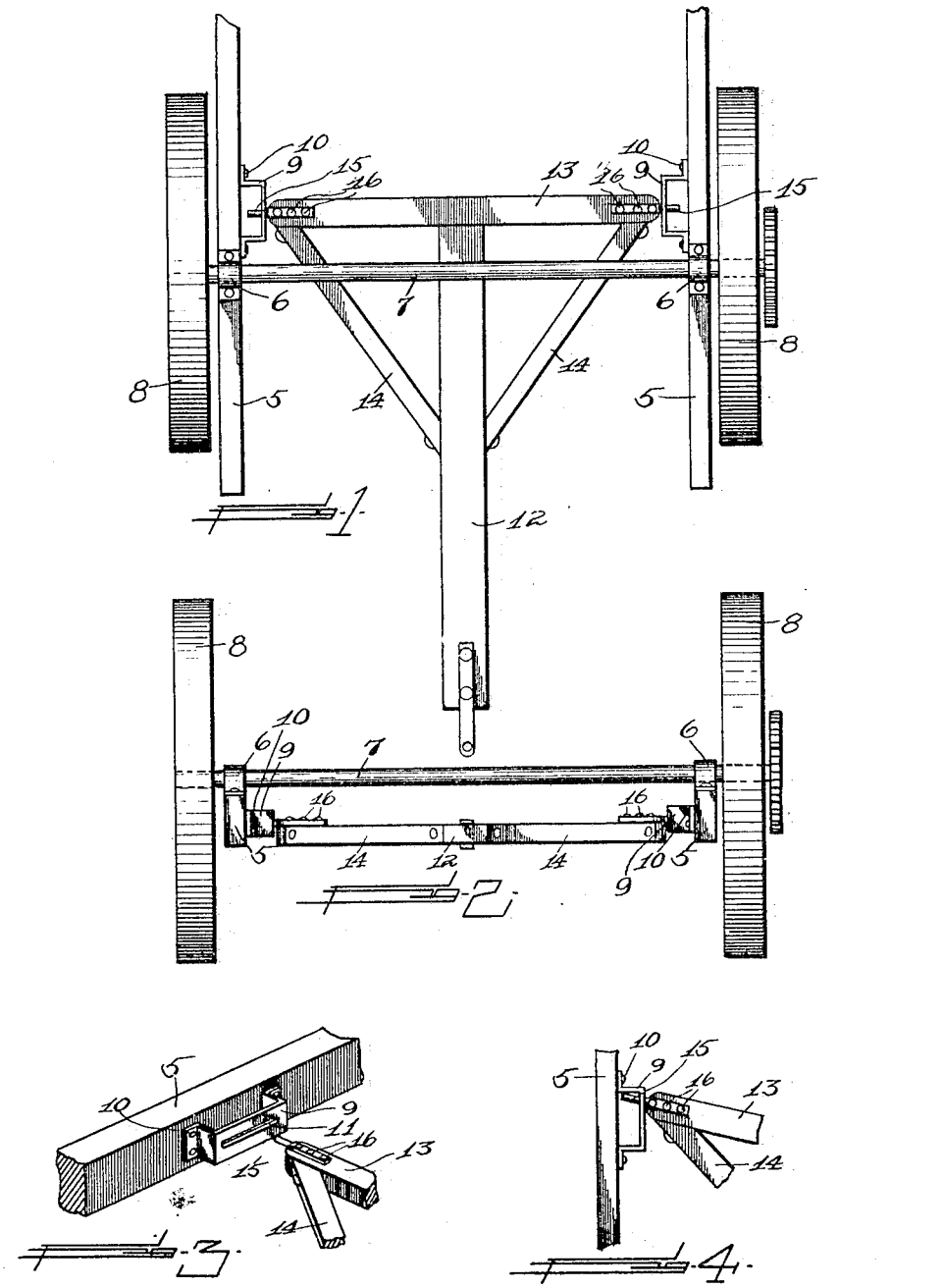

AUGUST OTTO, JR., OF SANDWICH, ILLINOIS.

DRAFT APPLIANCE FOR FARMING IMPLEMENTS.

1,091,587. Specification of Letters Patent. Patented Mar. 31, 1914.

Application filed April 12, 1913. Serial No. 760,802.

*To all whom it may concern:*

Be it known that I, AUGUST OTTO, Jr., a citizen of the United States, residing at Sandwich, in the county of Dekalb and State of Illinois, have invented certain new and useful Improvements in Draft Appliances for Farming Implements, of which the following is a specification.

This invention relates to draft appliances and has particular reference to means of this character embodying a tongue, pole or forwardly extending relatively rigid draft appliance which is so adjustably connected with the frame or body of a hay loader or other wheeled implement, or vehicle, that the tongue, pole or the like may be freely moved longitudinally or swung vertically and laterally to facilitate bringing the forward end thereof into position to be conveniently secured to a ring or bolt carried by a wagon or the like behind which the implement or vehicle is to be drawn.

An important object of this invention is to provide means of the above mentioned character, which are simple in construction, inexpensive to manufacture, strong, durable and convenient to use.

Other objects and advantages of this invention will be apparent during the course of the following description.

In the accompanying drawings forming a part of this specification and in which like numerals are employed to designate like parts throughout the same, Figure 1 is a plan view of the draft appliance, showing the same connected with the frame of a hay loader, Fig. 2 is a front end view of the same, Fig. 3 is a fragmentary perspective view of a portion of the draft appliance, and, Fig. 4 is a fragmentary plan view of a portion of the same, showing the transverse bar included in the draft appliance swung to a horizontal angular position.

In the drawings, wherein for the purpose of illustration is shown a preferred embodiment of my invention, the numeral 5 designates substantially horizontal beams, included in the frame of a hay loader or the like. These horizontal beams 5 carry upstanding brackets or bearings 6, through which is journaled an axle 7. This axle carries at its free ends traction wheels 8, as shown. Disposed adjacent the inner surfaces of the horizontal beams 5 and slightly to the rear of the axle 7, are substantially U-shaped brackets 9, which are connected with the beams 5 by bolts 10 or the like. As clearly shown in Fig. 2, the substantially U-shaped brackets 9 are disposed in a horizontal plane considerably below the axle 7. The substantially U-shaped brackets 9 are provided upon their longitudinal portions with horizontal elongated slots 11, for a purpose to be explained.

The numeral 12 designates a tongue or pole, rigidly connected at its rear end with a transverse bar or rod 13, at a point substantially equi-distant from the opposite ends of the bar 13, as shown. Rigidly connected with the ends of the transverse bar 13 are diagonal braces 14, extending forwardly and rigidly connected with the tongue 12, as shown. At its free ends, the transverse bar 13 carries outwardly extending cylindrical metal pins or rods 15, rigidly connected therewith and disposed for operation within the elongated horizontal slots 11. These pins or rods have the portion thereof in contact with the cross bar 13 flattened into strips which are secured to the bar by means of bolts 16 or the like.

In the use of the draft appliance in connection, for example, with a hay loader, the tongue or pole 12 may be moved longitudinally within the limits of the length of the slots 11 and be swung vertically and horizontally so that the forward end thereof may be easily and conveniently secured to a ring or bolt carried at the rear end of a hay wagon or other vehicle, which has been backed into somewhere near the correct position ahead of the loader, thus enabling the connection to be made without the delay and inconvenience of moving either the implement or the vehicle, as is ordinarily required. In addition to this advantage of each connection of the tongue or pole with a wagon, the construction is such as to permit of slight independent movements of the hay loader with relation to the wagon, without putting undue strain on the draft appliance, which is particularly advantageous where a heavy wheeled implement is drawn behind a vehicle.

It is to be understood that the form of my invention herewith shown and described is to be taken as a preferred example of the same, and that various changes in the shape, size arrangement of parts and details of construction may be resorted to without departing from the spirit of the invention or the scope of the subjoined claims.

Having described my invention, I claim:—

1. The combination with the frame of a vehicle, of spaced separate longitudinally extending slotted members carried thereby, and a forwardly extending relatively rigid draft appliance provided near its inner end with a transverse element having its opposite ends pivotally and slidably mounted within the slots of the slotted members.

2. The combination with spaced side members of a vehicle, of relatively rigid means pivotally and slidably connected with the side members, and a relatively rigid draft appliance connected with said means.

3. The combination with side members of a vehicle, of spaced elements carried thereby, elements slidably mounted upon the first named elements to move longitudinally thereof, a transverse bar attached near its ends to the second named elements, and a forwardly extending relatively rigid draft appliance connected with the transverse bar.

4. The combination with side members of a vehicle, of spaced elements connected with the side members and extending longitudinally of the implement or vehicle, elements pivotally and slidably mounted upon the first named elements to move longitudinally thereof, a forwardly extending pole, and a laterally extending device connected with the pole and with the slidable elements.

5. The combination with longitudinal beams of a vehicle, of spaced elements attached to the longitudinal beams and extending longitudinally of the implement or vehicle, a transverse bar, slidable and pivotal connecting means between the ends of the transverse bar and the spaced elements, and a forwardly extending relatively rigid draft appliance attached to the transverse bar.

6. The combination with brackets provided with elongated slots and connected with the frame of an implement or vehicle, of a transverse bar carrying at its opposite ends pins operating within the elongated slots, and a pole connected with the transverse bar between the ends thereof.

7. The combination with spaced brackets provided with elongated slots and connected with the frame of an implement or vehicle, of a transverse bar disposed therebetween and provided at its ends with reduced extensions passing into the elongated slots for operation therein and a pole connected with the transverse bar between the ends thereof.

8. The combination with substantially U-shaped horizontally arranged brackets provided upon their longitudinal portions with elongated slots and rigidly connected with spaced beams of the frame of an implement or vehicle, of a transverse bar disposed between the spaced substantially U-shaped brackets, pins attached to the opposite ends of the transverse bar and extending into the elongated slots for operation therein, and a tongue connected with the transverse bar between the ends thereof.

9. A draft appliance of the character described, comprising spaced substantially U-shaped brackets which are normally substantially horizontally arranged and provided with elongated horizontal slots formed therethrough, a transverse bar disposed between the spaced brackets and provided at its ends with reduced extensions passing into the slots, and a pole connected with the transverse bar between the ends thereof.

In testimony whereof I affix my signature in presence of two witnesses.

AUGUST OTTO, Jr.

Witnesses:
E. C. MOSHER,
E. L. INGERSOLL.